United States Patent [19]

Neuhaus et al.

[11] Patent Number: 4,973,523
[45] Date of Patent: Nov. 27, 1990

[54] COMPOSITE MATERIAL FOR PLAIN BEARING ELEMENTS WITH AN OVERLAY OF ALUMINUM-BASED BEARING MATERIAL

[75] Inventors: Peter Neuhaus, Hochheim/Main; Albert Roth, Frankfurt; Michael Steeg, Ober-Olm, all of Fed. Rep. of Germany

[73] Assignee: Glyco-Metall-Werke Daelen & Loos GmbH, Wiesbaden, Fed. Rep. of Germany

[21] Appl. No.: 484,223

[22] Filed: Feb. 23, 1990

[30] Foreign Application Priority Data

Mar. 1, 1989 [DE] Fed. Rep. of Germany ....... 3906401

[51] Int. Cl.$^5$ ............... C22C 21/12; C22C 21/00; B32B 15/10
[52] U.S. Cl. ............... 428/653; 420/529; 420/530; 420/554; 428/654; 384/912
[58] Field of Search ............... 420/529, 530, 554; 428/653, 654; 384/912

[56] References Cited

U.S. PATENT DOCUMENTS

| | | | |
|---|---|---|---|
| 2,586,100 | 2/1952 | Schultz | 428/653 |
| 2,741,018 | 4/1956 | Schaefer | 428/653 |
| 3,545,943 | 12/1970 | Miller et al. | 420/530 |
| 3,576,832 | 4/1971 | Becker et al. | 420/530 |
| 4,822,561 | 4/1989 | Kamiya et al. | 420/530 |

FOREIGN PATENT DOCUMENTS 3640328  6/1988  Fed. Rep. of Germany .

Primary Examiner—Theodore Morris
Assistant Examiner—Robert R. Koehler
Attorney, Agent, or Firm—H. Gibner Lehmann; K. Gibner Lehmann

[57] ABSTRACT

Composite material for plain bearing elements of a type having a metallic backing and an overlay of aluminum-based bearing material applied on the back. The bearing material is a heterogeneous aluminum alloy having a matrix containing in addition to aluminum, nickel, manganese, and copper. There is dispersed within the matrix, segregated tin or segregated lead, in an amount of from 0.5% to 20% by weight in the case of tin. The matrix contains hard particles of nickel, manganese, nickel-manganese, and alloys of nickel-manganese, and are located in the bonding regions between the matrix and the segregated tin or segregated lead. The segregated tin or segregated lead deposits are substantially free of hard particles. The hard particles are substantially of a dimension $\leq 5$ um. and are present in a quantity of less than 5 hard particles of a dimension $\geq 5$ um. in a cube-shaped volume element, the edge of which is 0.1 mm. long.

11 Claims, 4 Drawing Sheets

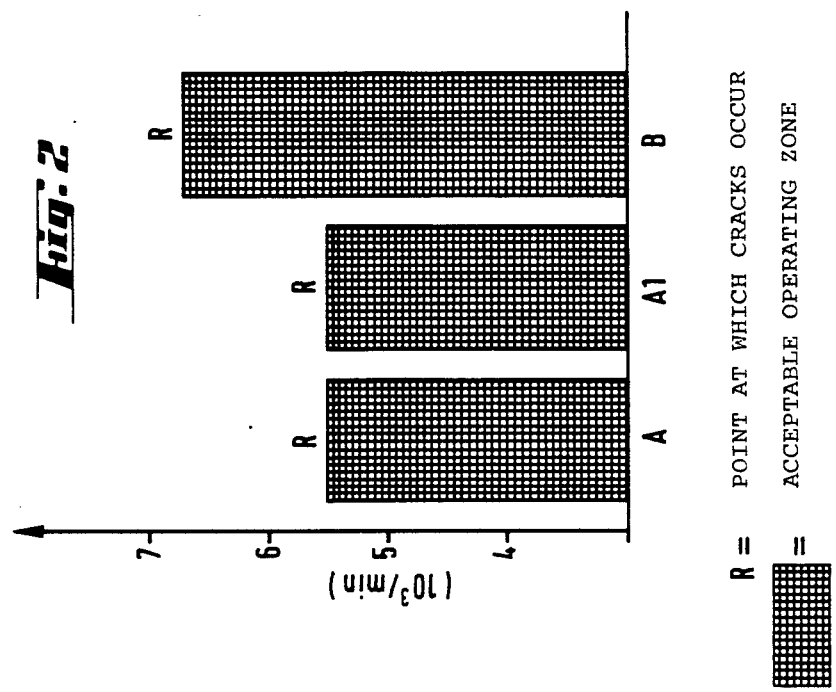
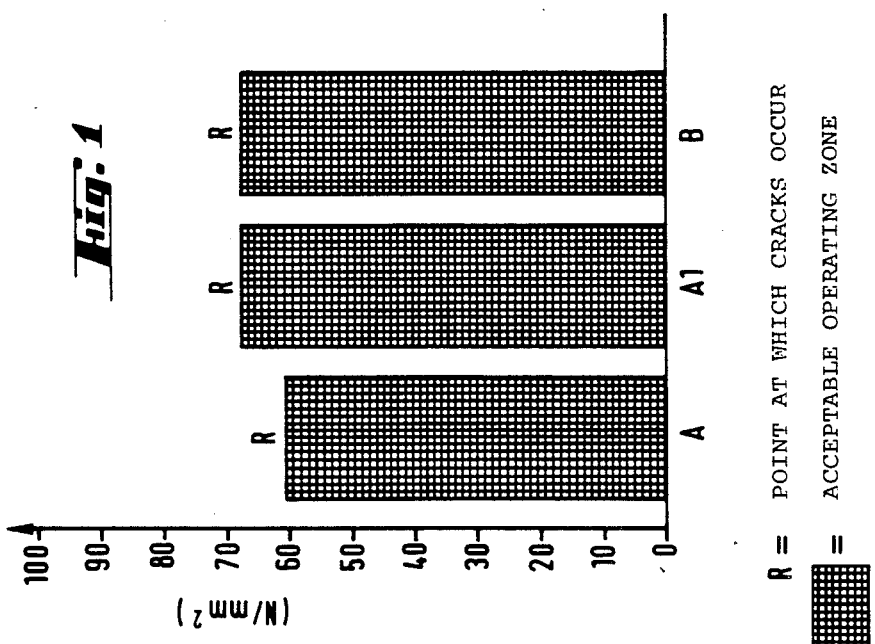

COMPOSITE MATERIAL FOR PLAIN BEARING ELEMENTS WITH AN OVERLAY OF ALUMINUM-BASED BEARING MATERIAL

CROSS REFERENCES TO RELATED APPLICATIONS

1. U.S. Application Ser. No. 124,617 filed Nov. 24, 1987, in the names of Michael Steeg, Peter Neuhaus, Albert Roth and Ulrich Engel, entitled LAMINATED MATERIAL FOR FRICTION BEARING ELEMENTS, COMPRISING AN ANTIFRICTION LAYER OF AN ALUMINUM BASED BEARING MATERIAL, and having common ownership with the present application, said U.S. Ser. No. 124,617 now abandoned.

2. U.S. Application Ser. No. 07/303,926 filed Jan. 30, 1989, in the names of Michael Steeg, Peter Neuhaus, Albert Roth and Ulrich Engel, entitled LAMINATED MATERIAL FOR FRICTION BEARING ELEMENTS, COMPRISING AN ANTIFRICTION LAYER OF AN ALUMINUM BASED BEARING MATERIAL, and having common ownership with the present application, said U.S. Ser. No. 07/303,926 now abandoned.

3. West German Application No. P 36 40 328.8 filed Nov. 26, 1986, and having common ownership with the present application.

4. West German Application No. P 37 29 414.8 filed Sept. 3, 1987 and having common ownership with the present application.

5 Copending U. S. Application Ser. No. 07/476,522, filed Feb. 7, 1990, in the names of Michael Steeg, Peter Neuhaus, Albert Roth and Ulrich Engel, entitled LAMINATED MATERIAL FOR FRICTION BEARING ELEMENTS, COMPRISING AN ANTIFRICTION LAYER OF AN ALUMINUM BASED BEARING MATERIAL, and having common ownership with the present application.

6. Applicants hereby claim priority under 35 USC 119, of West German Application No. P 39 06 401.8 filed Mar. 1, 1989.

STATEMENT AS TO RIGHTS TO INVENTIONS MADE UNDER FEDERALLY SPONSORED RESEARCH AND DEVELOPMENT.

Research and development of the present invention and application have not been Federally-sponsored, and no rights are given under any Federal program.

BACKGROUND OF THE INVENTION

Field of the Invention

This invention relates to a composite material for plain bearing elements, e.g. plain journal bearings or plain thrust bearings, of the type having a metallic backing and an overlay of aluminum-based bearing material applied on the backing.

DESCRIPTION OF THE RELATED ART INCLUDING INFORMATION DISCLOSED UNDER 37 CFR §§1.97–1.99

More particularly, the bearing material under consideration is an aluminum alloy containing nickel in an amount of from 1% to 3% by weight and preferably 1.5% to 2.5% by weight; manganese in an amount of from 0.5% to 2.5% by weight and preferably 1% to 2% by weight, and copper in an amount of from 0.02% to 1.5% by weight and preferably between 0.3% and 0.8% by weight, the remainder being aluminum with conventional admissible impurities, wherein hard particles of nickel and/or manganese, or hard particles containing nickel and/or manganese are present in the bearing metal and are substantially of a dimension $\leq 5$ um., and where there are less than 5 particles, preferably at the most one particle of a dimension $\geq 5$ um. present in a cube-shaped volume element the edge of which is 0.1 mm. long.

A composite material of this kind is known from DE-PS No. 36 40 328, which material has excellent properties as a bearing material and is characterized by increased dynamic loadability when used as an overlay. However, increasingly more difficult operational conditions are currently being experienced in practice due to the higher output requirements of machines containing bearing elements, particularly internal combustion engines. Such requirements include increased rotational frequency or speed of the mounted shafts, reduction of the mass of the moving parts, reduction of tolerances between the sliding parts, and resultant lower oil flow-through and reduction of the thickness of the lubricating film, so that highly loaded plain bearings are now being required to operate for a longer period under conditions of worsening friction.

SUMMARY OF THE INVENTION

Accordingly it is an object of the present invention to provide an improved composite material for plain bearing elements of the kind indicated, in order to obtain superior emergency running characteristics and anti-seizure characteristics as compared to existing, known bearing elements, in order that in addition to high dynamic loadability, there are achieved better antifriction properties. These improved properties are particularly advantageous at increased rotational frequencies or speeds of turning shafts with which such bearing elements are often used.

This object is achieved, according to the invention, by the provision of a composite material for plain bearing elements comprising in combination a metallic backing and an overlay of aluminum-based bearing material applied on the backing. The bearing material is a heterogeneous aluminum alloy having a matrix comprising, in addition to aluminum, nickel in the amount of 1% to 3% by weight, manganese in the amount of from 0.5% to 2.5% by weight, copper in the amount of from 0.02% to 1.5% by weight, and having dispersed within the matrix, segregated tin in an amount of from 0.5% to 20% by weight. The matrix containing contains hard particles selected from the group consisting of nickel, manganese, nickel-manganese, and alloys of nickel-manganese, and the hard particles being are present in an amount of from 20% to 30% by weight of the matrix. The hard particles are located in the bonding regions between the matrix and the segregated tin. The segregated tin is substantially free of hard particles, and the hard particles within the matrix are substantially of a dimension $\leq 5$ um. and are present in a quantity of less than 5 hard particles of a dimension $\geq 5$ um. in a cube-shaped volume element the edge of which is 0.1 mm. long.

In particular, especially noteworthy is the fact that the aluminum alloy forming the bearing material contains an addition of tin in an amount of from 0.5% and 20% by weight, and preferably between 5% and 15% by weight.

By the combined effect of the copper addition, known per se, of up to 1.5% by weight, and the tin addition, according to the present invention there is achieved a fatigue-free operation of the plain bearing elements made of the composite material up to rotational frequencies or speeds between 6500 and 7000 revolutions per minute. The tin addition brings about also a considerable improvement of the sliding properties of the overlay. This is true particularly with the preferred tin addition in amounts between 5% and 15% by weight at which the aluminum alloy has the character of an aluminum/tin dispersion alloy. By the addition of copper, nickel and manganese there is obtained, in addition, improved mixed crystal strengthening on the one hand by the appearance of ternary and quaternary phases or mixed crystal types, and on the other hand by improved bonding of the added tin to the aluminum, or the tin phase to aluminum matrix, because copper, nickel and manganese can dissolve both in aluminum and tin. It is important, particularly to provide that the preferred amount of additional tin be between 5% and 10% by weight, i.e. if a formation of an aluminum/tin dispersion alloy is used, so that the nickel and manganese can form with the tin, hard mixed crystals and hard intermetallic compounds. An aluminum/tin dispersion alloy is thereby formed which contains very finely distributed hard particles both in the aluminum matrix and at the border of the tin phase.

A further advantage of the AlNiMnCu alloy containing a tin addition according to the invention is that it is possible to selectively control the degree of the strength values according to the choice and requirements of each individual case by the selection of corresponding temperatures of heat treatment or heat treatment cycles during processing. As presently understood, this possibility of controlling resides probably in the control of the mixed crystal supersaturation and also the size and quantity of segregates. If the bearing material is an aluminum/tin dispersion alloy, this mixed crystal supersaturation may be presumed to exist both in the aluminum matrix and in the tin phase.

The tin additive provides, in addition to improved slidability, also improved emergency running properties of the bearing material, while the copper additive acts, in this functional cooperation of the alloy additions, also as a stabilizer of the obtained properties.

In a modification of the invention, instead of the addition of tin, the aluminum alloy forming the bearing material may contain an addition of lead in the amount of from 1% to 10% by weight, preferably between 1% to 5% by weight. By the addition of lead there are achieved advantages comparable to those explained above in connection with a tin addition. The composite material according to the invention can therefore be modified also by the choice of a lead addition instead of a tin addition if desirable in a specific case.

In a particularly advantageous variant of the invention a bonding layer of pure aluminum or of an aluminum alloy which is free from segregated tin particles and segregated lead particles is provided between the overlay of the aluminum alloy and the backing, particularly a backing of steel. This significantly improves the bonding between the overlay and the backing, particularly a steel backing, especially where the bearing material forming the overlay is in the form of an aluminum dispersion alloy with tin or lead.

Other features and advantages will hereinafter appear.

BRIEF DESCRIPTION OF THE DRAWINGS

One embodiment of the invention will now be explained in greater detail with reference to the drawings, in which:

FIG. 1 is a bar graph for dynamic loadability of three sample bearing materials, designated A, A1, and B, respectively;

FIG. 2 is a bar graph setting forth the maximum achievable rotational frequency of a shaft, while still maintaining troublefree operation;

DESCRIPTION OF THE PREFERRED EMBODIMENTS

The bar graph in FIG. 1 shows dynamic loadability of composite materials having overlays of an aluminum-based bearing material related to 200 hours. The reference letter "R" used in FIGS. 1 and 2 indicates the points at which cracks appear in the aluminum layer if the value of the dynamic loadability (FIG. 1) or the number of revolutions per minute (FIG. 2) exceeds the maximum value below which trouble-free operation has been found to occur. The dynamic loadability is determined from residual loading curves of Underwood tests at 150° C. The composite materials being compared had a backing of steel and an overlay applied onto the backing by plating of a rolled metal sheet of a cast aluminum alloy with interposition of a foil of pure aluminum.

The composite materials being compared in the bar graph in FIG. 1 are the following:

A: steel/AlNi$_2$Mn$_1$

A1: steel/AlNi$_2$Mn$_1$ with an addition of Cu (0.5% by weight)

B: steel/Al/AlNi$_2$Mn$_1$Cu$_{0.5}$ with an addition of Sn (10% by weight).

As is apparent from the bar graph in FIG. 1, Component A, a composite material having a backing of steel and an overlay of AlNi$_2$Mn$_1$ may have a dynamic loadability of up to about 60 N/mm.$^2$. If the aluminum alloy has a copper addition of, for example, 0.5% by weight, the dynamic loadability may be increased to values between 60 and 70 N/mm.$^2$, typically about 65 N/mm.$^2$ (Component A1). As is shown for Component B of the bar graph, an aluminum alloy AlNi$_2$Mn$_1$ with a copper addition of 0.5% by weight and tin addition of 10% by weight can have approximately the same dynamic loadability as an aluminum alloy AlNi$_2$Mn$_1$ with a Cu addition of 0.5% by weight.

The usefulness of the information provided by the bar graph of FIG. 1 is limited, because it sets forth dynamic loadability from Underwood tests which corresponds to operational conditions for a shaft running at about 4000 revolutions per minute. As is shown by the bar graph in FIG. 2, the rotational frequency or speed of a journal or a shaft mounted in a bearing, achievable in trouble-free operation with the same dynamic loadability, is considerably dependent on the composition of the aluminum alloy used as the bearing material of the overlay. FIG. 2 clearly shows the superiority of the examined Component or alloy B compared with the Components or alloys A and A1 Rotational frequency of over 6500 revolutions per minute may be achieved in trouble-free operation with an overlay of alloy B. In addition the alloy B has further improved properties as a bearing material which are not immediately recognizable from the bar graphs in FIGS. 1 and 2. These include particularly: resistance against seizing, improved resistance to wear, improved sliding properties (reduced friction) and improved emergency running properties, so that no accommodation layer or running-in layer is needed.

FIGS. 3 to 6 show the use of the composite material for bearing liners, i.e. plain bearings composed of two half-liners.

Figure 3:
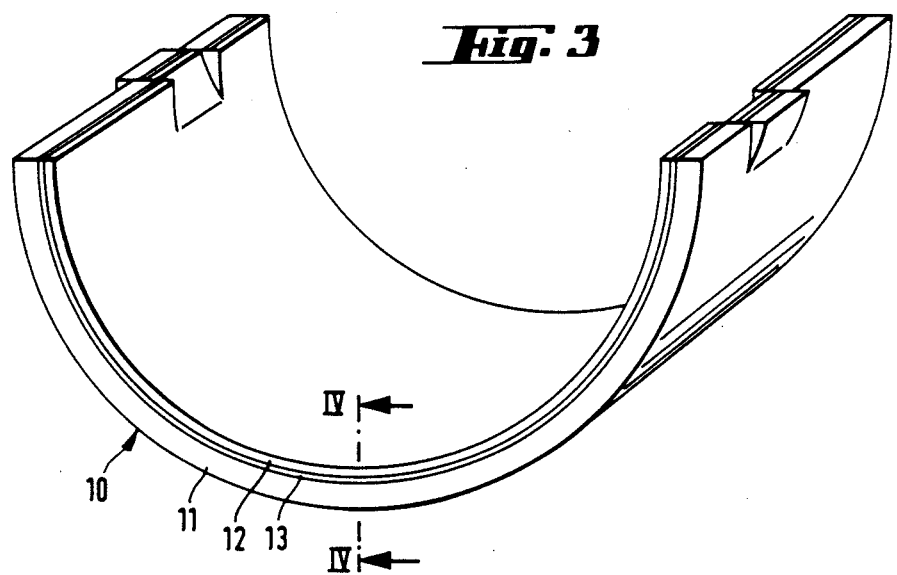
FIG. 3 is a perspective view of a composite material according to the invention, in the form of a plain bearing half-liner.
Figure 4:
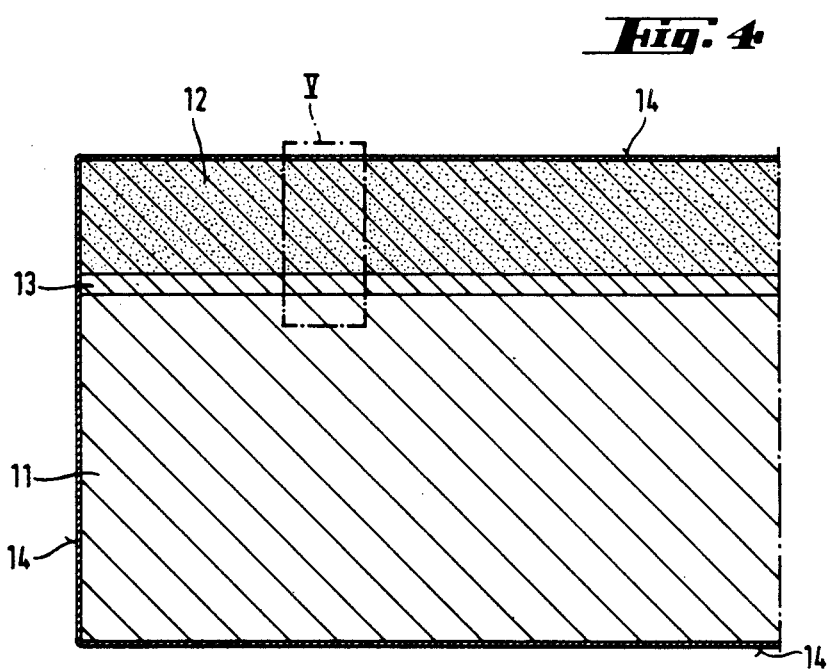
FIG. 4 is a section along line IV—IV of FIG. 3.

The plain bearing liner 10, shown in FIG. 3 in perspective and in FIG. 4 in partial section, has a backing 11 of steel. On this backing 11 is applied a 0.2 mm. to 0.5 mm. thick overlay 12, with a bonding layer 13 being interposed between these two elements. In the illustrated example the bonding layer 13 consists of a pure aluminum foil. Also, bonding layers of aluminum alloys may be used, which should be free of segregated particles of tin and/or lead. In the illustrated example the overlay 12 is made of the above mentioned alloy B, namely $AlNi_2Mn_1Cu_{0.5}$ with a tin addition of 10% by weight. The whole composite material or the plain bearing liner 10 is coated by an anti-corrosion layer 14, which is preferably electroplated thereon and constituted of tin or tin/lead alloy. It is a thin flash which is hardly visible on the surface of the overlay 12 but offers an effective protection against corrosion, particularly in the region of the steel backing 11.

Figure 5:
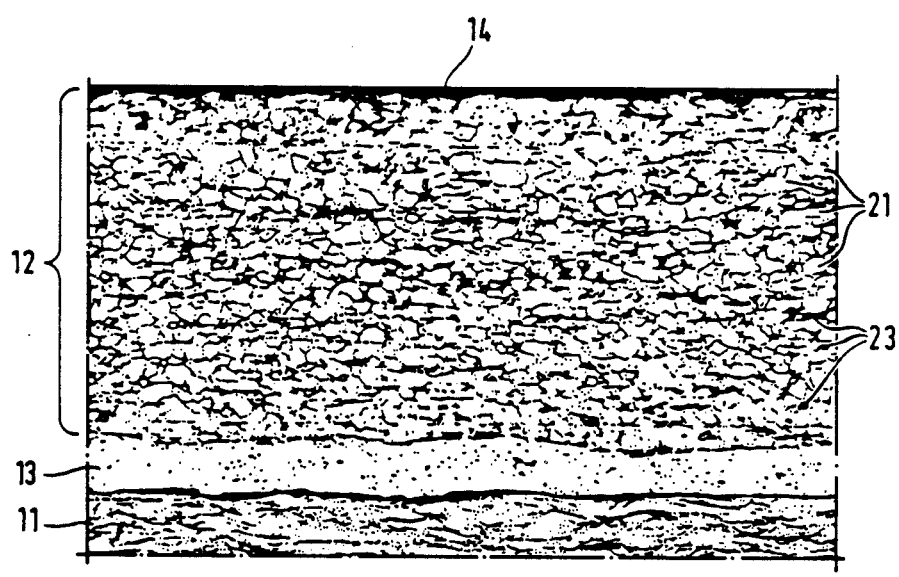
FIG. 5 is an enlarged section along line V—V of FIG. 4.

As is shown in FIG. 5, $AlNi_2Mn_1Cu_{0.5}$ with an addition of 10% by weight of Sn forms a dispersion alloy in which the segregated tin particles 23 appear dark in the crystallized matrix of $AlNi_2Mn_1Cu_{0.5}$.

Figure 6:
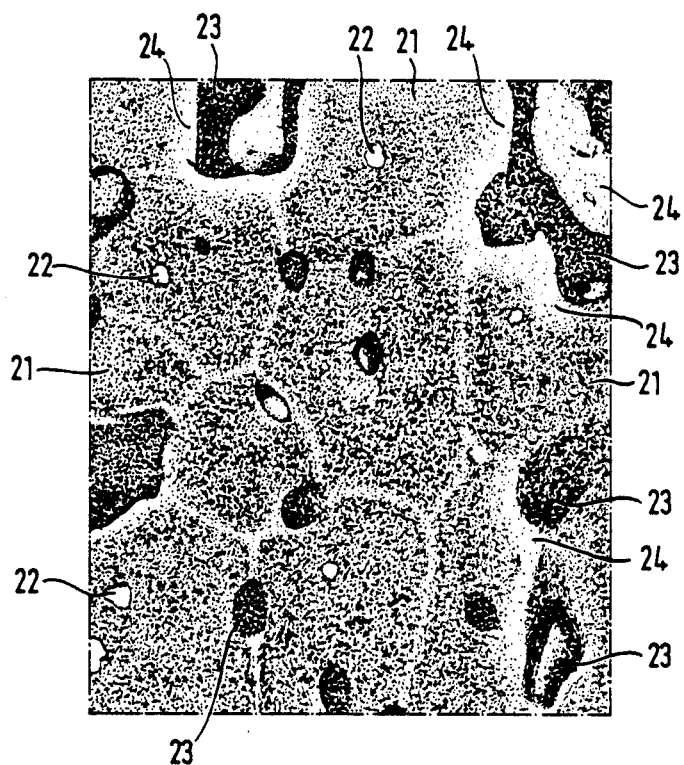
FIG. 6 is a photomicrograph of a section along line VI—VI of FIG. 5, made with the use of a scanning electron microscope.

The bonding of the segregated tin particles in the $AlNi_2Mn_1Cu_{0.5}$ matrix is more clearly visible in the photomicrograph of FIG. 6 made with the use of a scanning electron microscope. The matrix of aluminum-nickel-manganese-copper alloy is characterized by an inner grain texture. This is normal for metallic alloys, and is the result of the cooling of the alloy from its molten state to its solid state. In the cooling process, two different kinds of segregations are formed (1) hard particles consisting of nickel, manganese, nickel-manganese, and alloys of nickel-manganese; and (2) segregations of tin (or alternately, of lead where lead is employed in place of tin) in the form of a separate phase which is dispersed within the matrix. Most of the hard particles 22, when segregrated from the aluminum alloy, are located at the grain boundaries within the matrix. A minor number of these hard particles is located in the bonding zone between the matrix and the tin phase. In FIG. 6, the grain boundaries are illustrated as being lighter areas within the matrix. Hard particles which are located within the bonding zone between the matrix and the tin phase are not visible because they are too small. Further, they are not visible or contrasted because the bonding zone itself appears light in color in the figure, as would hard particles.

In FIG. 6, some larger hard particles 22 in the matrix appear to be located between the grain boundaries and not adjacent the grain boundaries. There are two reasons for this appearance. Not all hard particles become located, during segregation, at the grain boundaries. Instead there may be hard particles which are located within a grain itself; also, since FIG. 6 is a section, there are grain boundaries which lie in or otherwise cross the plane of the section of FIG. 6, so that some hard particles which appear to be located within a grain in FIG. 6 are in actuality, located at a grain boundary which is within the section plane. Stated differently, because the section of FIG. 6 lacks depth, the three-dimensional positioning of the hard particles with respect to the grains of the matrix cannot be truly represented.

In FIG. 6, most of the hard particles have dimensions $\leq 5$ um. and therefore are too small to be visible in the photomicrograph. The hard particles are segregated from the $AlNi_2Mn_1Cu_{0.5}$ grains preferably at the grain boundaries and partially into the bonding regions 24 also. Only a few hard particles 22 have dimensions $\geq 5$ um. and such hard particles 22 are reasonably assumed to be large enough to be properly shown in the photomicrograph of FIG. 6. In the case of such hard particles 22 appearing to be located within the $AlNi_2Mn_1Cu_{0.5}$ grains, it should be recognized that in actuality, such hard particles 22 are more likely located at grain boundaries which are lying practically within the plane of section of the photomicrograph of FIG. 6. Further, the photomicrograph of FIG. 6 shows the segregated tin or segregated lead particles 23 which appear darkest in the figure, and bonding areas 24 between the matrix grains 21 and the tin or lead particles 23. Such bonding areas 24 appear as light colored areas in FIG. 6 and preferably contain mixed crystals with an increased content of copper, nickel and manganese. The segregated tin or lead particles 23 may contain at the regions adjacent to the bonding regions 24, nickel, tin and copper which are believed to have, in the manner of mixed crystals, improved bonding to the bonding regions 24 of the matrix grains 21. Improved bonding between the matrix grains 21 and tin particles 23 may therefore be assumed to exist in these regions 24, as presently understood.

It is noted that the relative amounts of hard particles of each type is dependent upon the relative amounts of nickel and manganese which are initially added to the aluminum base. If a high amount of nickel and a relatively lower amount of manganese are used, the hard particles formed during cooling the molten alloy are preferably of the nickel type, with fewer nickel-manganese hard particles, and very few manganese hard particles. Different compositions result if different relative amounts of nickel and manganese are employed, and accordingly the inventors have found that it is not possible with any degree of certainty, to determine a specific relationship that correlates the relative amounts of hard particles as a function of the relative proportions of nickel and manganese employed with the original aluminum, to form the aluminum alloy.

The flash 14 of tin or tin-lead alloy, which is shown in FIG. 4 and provides protection against corrosion particularly on the steel backing 11, may act on the free surface of the overlay 12, which serves as the sliding surface, as a first solid lubricant during running-in and may at the same time smooth out possible unevenness on the surface of the overlay 12 of aluminum alloy or aluminum dispersion alloy.

From the above it can be seen that we have provided a significantly improved bearing material which is characterized by superior emergency running properties, higher resistance against seizure, high dynamic loadability, and better anti-friction functionality. The bearing material is thus especially suited for trouble-free performance with shafts turning at relatively high operating speeds on the order of 6500 revolutions per minute or more.

The disclosed materials are thus seen to represent a distinct advance and improvement in the technology of bearings.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. Composite material for plain bearing elements, comprising in combination a metallic backing and an overlay of aluminum-based bearing material applied on the backing, the bearing material being a heterogeneous aluminum alloy having a matrix comprising, in addition to aluminum, nickel in the amount of 1% to 3% by weight, manganese in the amount of from 0.5% to 2.5% by weight, copper in the amount of from 0.02% to 1.5% by weight, and having a grain texture, said alloy containing tin in an amount of from 0.5% to 20% by weight of the alloy and in a segregated and dispersed condition within the matrix, said matrix containing hard particles selected from the group consisting of nickel, manganese, nickel-manganese, and alloys of nickel-manganese, said hard particles being present in an amount of from 20% to 30% by weight of said matrix, said hard particles being located at the grain boundaries within said matrix preferably, and also partially in the bonding regions between said matrix and said segregated tin, said segregated tin being substantially free of said hard particles, and further that said hard particles within said matrix being substantially of a dimension $\leq 5$ um. and being present in a quantity of less than 5 hard particles of a dimension $\geq 5$ um. in a cube-shaped volume element the edge of which is 0.1 mm. long.

2. Composite material according to claim 1, wherein the aluminum alloy comprises nickel in an amount of from 1.5% to 2.5% by weight, manganese in an amount of from 1% to 2% by weight, and copper in an amount of from 0.3% to 0.8% by weight, and at most there is present one hard particle in said cube-shaped volume element.

3. Composite material according to claim 1, wherein the aluminum alloy contains additional tin in the amount of from 5% to 15% by weight.

4. Composite material according to claim 1, wherein the aluminum alloy contains additional nickel in the amount of 2% by weight, additional manganese in the amount of 1% by weight, and additional copper in the amount of 0.5% by weight.

5. Composite material according to claim 1, wherein the aluminum alloy contains additional tin in the amount of 10% by weight.

6. Composite material according to claim 1, and further including a bonding layer of material selected from the group consisting of pure aluminum, an aluminum alloy, and aluminum alloys, which bonding layer is free from segregated tin and is disposed between the overlay and the metallic backing.

7. Composite material for plain bearing elements, comprising in combination a metallic backing, and an overlay of aluminum-based material applied on the backing, the bearing material being a heterogeneous aluminum alloy having a matrix comprising in addition to aluminum, nickel in the amount of 1% to 3% by weight, manganese in the amount of from 0.5% to 2.5% by weight, copper in the amount of from 0.02% to 1.5% by weight, and having a grain texture, said alloy containing lead in an amount of from 1% to 10% by weight of the alloy and in a segregated and dispersed condition within the matrix, said matrix containing hard particles selected from the group consisting of nickel, manganese, nickel-manganese, and alloys of nickel-manganese, said hard particles being present in an amount of from 20% to 30% by weight of said matrix, said hard particles being located at the grain boundaries within said matrix preferably, and also partially in the bonding regions between said matrix and said segregated lead, said segregated lead being substantially free of said hard particles, and further that said hard particles within said matrix being substantially of a dimension $\leq 5$ um. and being present in a quantity of less than 5 hard particles of a dimension $\geq 5$ um. in a cube-shaped volume element the edge of which is 0.1 mm. long.

8. Composite material according to claim 7, wherein the heterogeneous aluminum alloy comprises nickel in the amount of from 1.5% to 2.5% by weight, manganese in the amount of from 1% to 2% by weight, and copper in the amount of from 0.3% to 0.8% by weight, and at most one of said hard particles in said volume element.

9. Composite material according to claim 7, wherein the heterogeneous aluminum alloy contains lead in the amount of from 1% to 5% by weight.

10. Composite material according to claim 7, wherein the heterogeneous aluminum alloy contains additional nickel in the amount of 2% by weight, additional manganese in the amount of 1% by weight, and additional copper in the amount of 0.5% by weight.

11. Composite material according to claim 7, and further including a bonding layer of material selected from the group consisting of pure aluminum, an aluminum alloy, and aluminum alloys, which bonding layer is free from segregated lead and is disposed between the overlay and the metallic backing.

* * * * *